(12) United States Patent
Peeters

(10) Patent No.: US 9,314,977 B2
(45) Date of Patent: Apr. 19, 2016

(54) METHOD OF PRODUCING A PANEL AND A CORE THEREFOR

(75) Inventor: Johannes Hendricus Alphonsus Peeters, Rotterdam (NL)

(73) Assignee: FIBERCORE IP B.V., Rotterdam (NL)

( * ) Notice: Subject to any disclaimer, the term of this patent is extended or adjusted under 35 U.S.C. 154(b) by 1340 days.

(21) Appl. No.: 13/130,162

(22) PCT Filed: Nov. 19, 2009

(86) PCT No.: PCT/NL2009/050698
§ 371 (c)(1),
(2), (4) Date: Aug. 2, 2011

(87) PCT Pub. No.: WO2010/059048
PCT Pub. Date: May 27, 2010

(65) Prior Publication Data
US 2011/0278761 A1 Nov. 17, 2011

(30) Foreign Application Priority Data

Nov. 19, 2008 (NL) .................................... 1036212

(51) Int. Cl.
| B29C 70/36 | (2006.01) |
|---|---|
| B29C 70/48 | (2006.01) |
| B29C 70/08 | (2006.01) |
| B29C 70/44 | (2006.01) |
| B29C 70/54 | (2006.01) |
| B29C 70/86 | (2006.01) |

(52) U.S. Cl.
CPC .............. *B29C 70/48* (2013.01); *B29C 70/086* (2013.01); *B29C 70/443* (2013.01); *B29C 70/547* (2013.01); *B29C 70/865* (2013.01); *Y10T 428/24479* (2015.01)

(58) Field of Classification Search
CPC ................................................... B29C 70/443

USPC ................................................... 264/510, 554
See application file for complete search history.

(56) References Cited

U.S. PATENT DOCUMENTS 6,159,414 A * 12/2000 Tunis et al. .................... 264/510

FOREIGN PATENT DOCUMENTS

| DE | 103 04 044 | 8/2004 |
|---|---|---|
| EP | 1 162 058 | 12/2001 |
| WO | 89/00495 | 1/1989 |
| WO | 02/058915 | 8/2002 |

OTHER PUBLICATIONS

International search report dated Jul. 26, 2010 in corresponding PCT/NL2009/050698.

\* cited by examiner

*Primary Examiner* — Galen Hauth
(74) *Attorney, Agent, or Firm* — Young & Thompson

(57) ABSTRACT

A method of producing a panel includes:
placing an assembly including core elements and impregnatable material webs extending along and between the core elements on a mold, which assembly includes a first side and a second side which is situated opposite the first side,
enclosing the assembly under a cover layer in a sealing manner with respect to the mold,
introducing at least one inlet for injection material, which inlet ends at a first side of the assembly,
connecting the space which is enclosed by the cover layer and the mold to a discharge,
injecting injection material via the inlet on the first side of the assembly and causing the injection material to move along via paths formed by the material webs between the core elements,
discharging air and/or gas from the enclosed space via the discharge via underpressure at a position which is at a different level to the position where the inlet ends.

10 Claims, 5 Drawing Sheets

METHOD OF PRODUCING A PANEL AND A CORE THEREFOR

BACKGROUND OF THE INVENTION

1. Field of the Invention

The invention relates to the production of panels, in particular sandwich panels, from fibre-reinforced plastic materials. In this connection, consideration may in particular be given to panels which are subject to high loads, for example for bridge decks, which have to be able to withstand the total load which is the sum of the weight of the bridge itself and the weight of the road traffic, as well as the local loads which are caused by wheels and the like.

2. Description of the Related Art

With the traditional process of producing such a panel, a shell is first produced in a mould which has the desired complementary shape of, for example, the bridge deck. This shell consists of fibre-reinforced plastic, as can be produced by impregnating fibre webs or mats with resin. A core is arranged on this shell, following which a second shell is then constructed. After these components have been assembled correctly, the semifinished product obtained is ready for further processing.

One of the drawbacks of this method is its complexity. The process in question comprises four steps, i.e. producing the first shell, producing the core, placing the core on the first shell, producing the second shell and placing the second shell on the core. This is the reason why such a process is time consuming. A further drawback of this method is the risk that the interface between the core and the skins is not completely moistened during adhesive bonding, which may result in inclusions of air which are disadvantageous for the strength and stiffness of the resultant product.

BRIEF SUMMARY OF THE INVENTION

It is therefore the object of the invention to provide a more efficient and more reliable method of producing a fibre-reinforced panel. This object is achieved by means of the following steps:

placing an assembly comprising core elements and impregnatable material webs extending along and between the core elements on a mould, which assembly comprises a first side and a second side which is situated opposite the first side, enclosing said assembly under a cover layer in a sealing manner with respect to the mould, introducing at least one inlet for injection material, which inlet ends at the first side of the assembly, connecting the space which is enclosed by the cover layer and the mould to a discharge, injecting injection material via the inlet on the underside of the assembly and causing the injection material to move along via the paths formed by the material webs between the core elements, discharging air and/or gas from the enclosed space via the discharge by means of underpressure at a position which is at a different level to the position where the inlet ends.

With the method according to the invention, impregnating the various parts of the panel is concentrated in one and the same production stage. In this case, the two shells and the core are simultaneously formed and attached to one another. If, in addition, the injection material is supplied directly at the underside of the panel, there is hardly any risk of inclusions of air forming. The front of the injection material gradually moves upwards and during this process forces any inclusions of air and possible other gases upwards and pushes them ahead of it, as a result of which these can be extracted in a reliable manner. However, it is not necessary to supply the injection material to the underside. Alternatively, the material can also be supplied to the upper side so that it gradually moves down. In this case, there may be some inclusions of air, but this does not have to be a problem with all applications.

Preferably, prismatic cores, in particular block-like cores, are used. The material webs may extend across in each case the upper side of a number of cores, between in each case two adjacent cores and across or along the underside of a number of cores. In this manner, a panel is obtained which has excellent properties with regard to the total strength and stiffness as well as regarding the resistance against local loads. In particular, the method according to the invention may comprise the steps of:

arranging prismatic cores parallel to one another, providing injection lines which extend across the mould and on the first side of the series and which are oriented transversely to the core elements, which injection lines are connected to an inlet.

The fact that the injection lines extend transversely with respect to the core elements has the advantageous result that the injection material can be distributed evenly in the width direction across the adjacent core elements. This is a first measure which is intended to cause the front of injection material to gradually move upwards and downwards, respectively, in an evenly distributed manner. However, parts of the material webs may be present between the various core elements. In order to be able to distribute the injection material evenly across the width of the adjacent cores even in those cases, the method according to the invention preferably also comprises the following steps:

providing in each case a passage in the material web parts which extend between adjacent blocks, providing in each case an injection line through a series of aligned passages in the material web parts.

This means that during the construction of the core, a hole is made in the respective part of the material webs each time a core element with a material web thereon is placed. To this end, it is necessary to assemble the injection lines from parts which can each be inserted through the respective hole. According to the invention, this is achieved by the following steps:

providing injection line pieces having a length dimension which is equal to the thickness dimension of a core element, inserting an injection line piece into the passage in said material web after a core element has been placed and an associated material web has been arranged over said core element and attaching said injection line piece to a previously placed injection line piece or to an inlet piece.

It is also important that the displaced air or gases can be discharged in a regular manner, so that no local pressure differences can be created which could disturb the formation of an evenly advancing front. To this end, the method also comprises the following steps:

placing in each case a discharge line transversely across the second side of the core elements and across the material web parts which extend along the core elements, offsetting a discharge line in the centre between in each case two injection lines.

The transversely placed discharge line or discharge lines ensure that, viewed in the width direction of the cores, a regular and even discharge of the displaced air and/or gases is ensured. The offset position of the discharge lines with respect to the inlet lines which are situated below or above ensures that the path along which the air or the gases are discharged is more or less the same for all cores, viewed from the inlet lines. This prevents the occurrence of short-circuit flows which could result in the formation of an irregular front.

As has already been stressed above, it is very important that the injection material rises again between the cores in a more even manner. In this connection, several more additional measures may be taken which can ensure the formation of an even front and a smooth through-flow. By way of a first option, the following steps are mentioned:

providing core elements having in each case a groove which extends transversely to the injection line in the first surface thereof and side wall grooves provided in the side walls extending parallel to said groove, which groove in the first surface and which side wall grooves are all separated from one another, causing the injection material to flow laterally from the groove situated in the bottom surface groove via the material of the material webs as far as into the side wall grooves. With such core elements, the injection material initially flows through the groove in the first surface, that is to say usually in the length direction of each core. As soon as such a groove is completely filled, the injection material can only flow further by leaving the groove. At this stage, the injection material touches the material of the material webs, which results in a throttling effect, thus ensuring that said material of the material webs is moistened along the entire length of the groove. The injection material then passes into the side wall grooves via the material webs, as a result of which the actual formation of the front in the upward and/or downward direction is stimulated.

The cores may also play an important part in extracting the gases or the air. This may be achieved by the following steps:

providing core elements, each of which has groove parts which are in the second surface thereof, are separated from one another and end at opposite transverse sides of the cores, and which groove parts are parallel to the side walls in which the side wall grooves are situated, which groove parts and which side wall grooves are all separated from one another, causing the injection material to flow from the side wall grooves as far as into the groove parts via the material of the material webs, positioning in each case a discharge line between the ends of the groove parts facing one another in the second surface of the core elements.

The discharge of the injection material from the side wall grooves to and into the groove parts in the second surface of the core elements again takes place via the material of the material web parts. In this case, an even distribution of the injection material is achieved again as well. The grooves in the second surface of the core elements do not extend as far as the discharge line, so that the injection material again first has to flow through the material of the material web parts on top of the core elements before reaching the discharge line.

With relatively large structures, as will usually be the case with bridges, the problem may occur that the injection material penetrates less well along the edges of the assembly. This may be prevented by the following steps:

placing at least one auxiliary injection line at least one of the edges of the assembly, in a first phase, injecting the injection material only through those injection lines which extend transversely, in a second phase, also injecting injection material through the auxiliary injection line.

In this connection, a further improvement of the injection of the injection material can be obtained by the following steps:

placing an annular auxiliary injection line around the assembly, providing a discharge which is situated in the centre with respect to the annular line, connecting an auxiliary extraction line on one side of the assembly in a position above the inlet line for supplying injection material to the assembly, said extraction line is connected to the inlet line by means of a low-permeability restrictor having a low flow resistance for gases and a high resistance for transportation of liquids, extracting a portion and only a portion of the injection material from the extraction line on the injection line, at a location thereof situated opposite the side where the inlet is situated, extracting gases and/or air via the discharge there.

Extracting the injection material from the auxiliary extraction line has the advantage that the permeation of gases in the assembly on said side is kept in check. In practice, it has been found that on that side lying opposite the side where the inlet is situated, preferential transportation of gas may occur via a short-circuit flow to the centre of the assembly, in which centre the main discharge is situated. By now extracting the injection material to a limited degree at the injection lines on said opposite side, and thus collecting the gas before it enters the assembly, the occurrence of inclusions of air is prevented and it is still possible to achieve a high-quality impregnation.

The invention also relates to a core element for use with the method as described above. This core element is in the shape of a block having a first surface, a second surface situated opposite the first surface and mutually facing longitudinal side faces and mutually facing transverse side faces, wherein the first surface is provided with a continuous groove which extends parallel to the longitudinal side faces.

The longitudinal side faces may furthermore be provided with continuous grooves which extend between the first surface and the second surface and are separated from the groove in the first surface. The second surface may also be provided with two mutually separated groove parts, each of which ends at a transverse side face, which groove parts are separated from the grooves in the longitudinal side faces. In a further embodiment, the first surface may be provided with opposite recesses, each of which is adjacent to a transverse side face and in which the groove situated in said first surface ends. The injection lines may be accommodated in said recesses.

BRIEF DESCRIPTION OF THE DRAWINGS

The invention will now be explained in more detail with reference to an exemplary embodiment illustrated in the figures, in which.

DETAILED DESCRIPTION OF THE PREFERRED EMBODIMENTS

Figure 1:
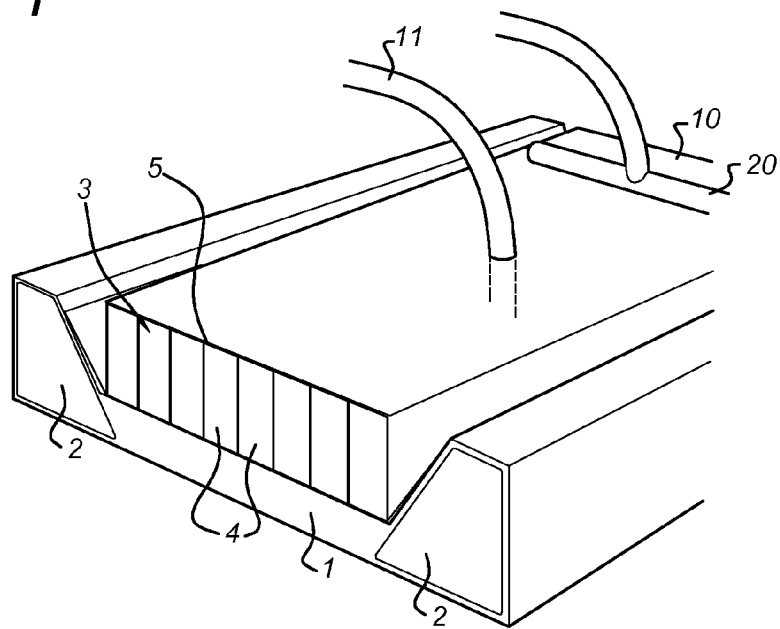
FIG. 1 shows a view in perspective and in cross section of a mould with an assembly according to the invention.
Figure 6:
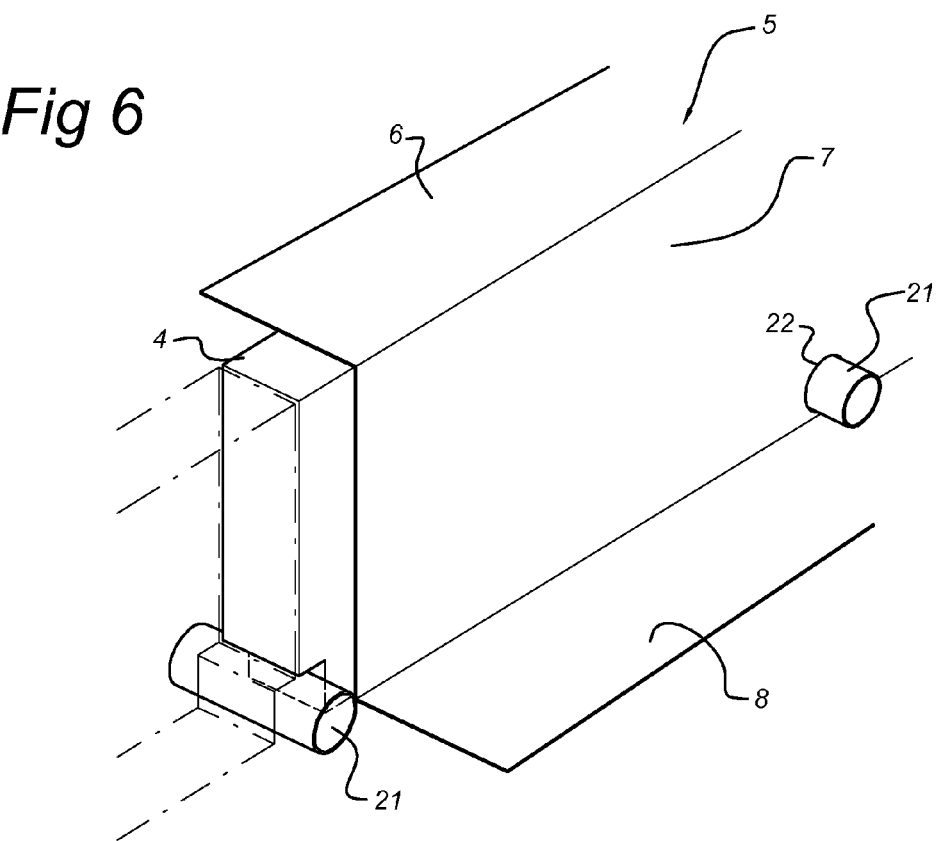
FIG. 6 shows a perspective view of a core element, pipe piece and material web.
Figure 7:
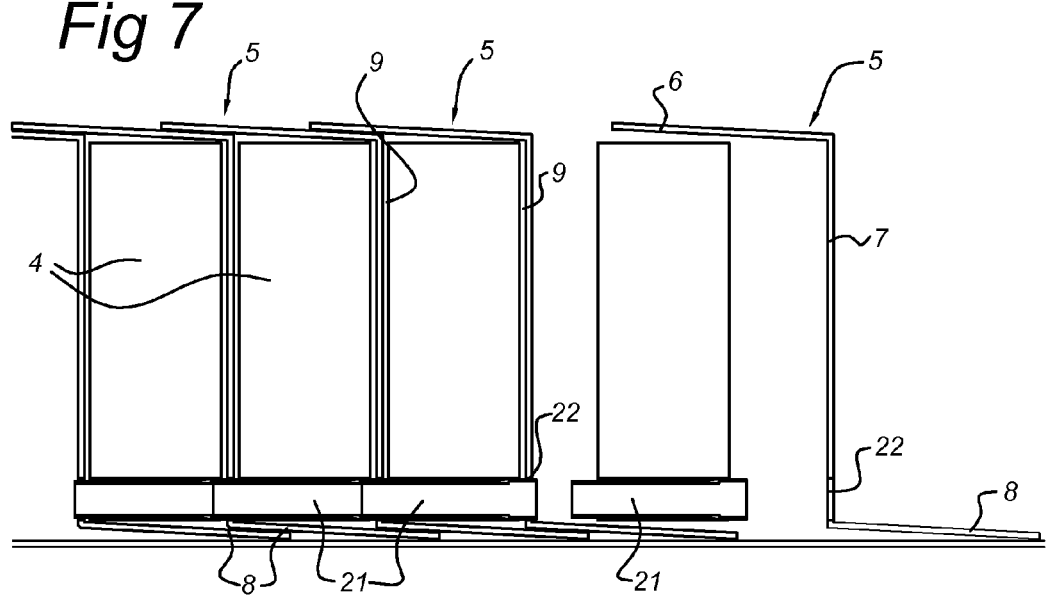
FIG. 7 shows the view according to VII from FIG. 6.

FIG. 1 shows a mould 1 on which an assembly 3 consisting of adjacent core elements 4 and material webs 5 is arranged. This assembly 3 is covered by the cover layer 10 which is closed along the longitudinal edges with respect to the mould 1. The mould 1 is also provided with longitudinal elements 2 in order to give the assembly 3 a desired shape for the production of a bridge element. In the view of FIGS. 6 and 7, it can be seen that the material web 5 is arranged over each core element 4 substantially according to a Z-shaped configuration with a material web part 6 which covers the upper side of the respective core element 4 and a material web part 7 which covers a vertical side of the core element 4 and a horizontal material web part which extends over the mould and is turned away from the core element 4. The various horizontal material web parts 6 of neighbouring material webs 5 overlap one another, as do the horizontal material web parts 8 thereof, as can be seen in FIG. 7. The material web parts 7, which extend between in each case two adjacent core elements 4, form paths 9 via which injection material can rise, as will be explained below in more detail.

Figure 2:
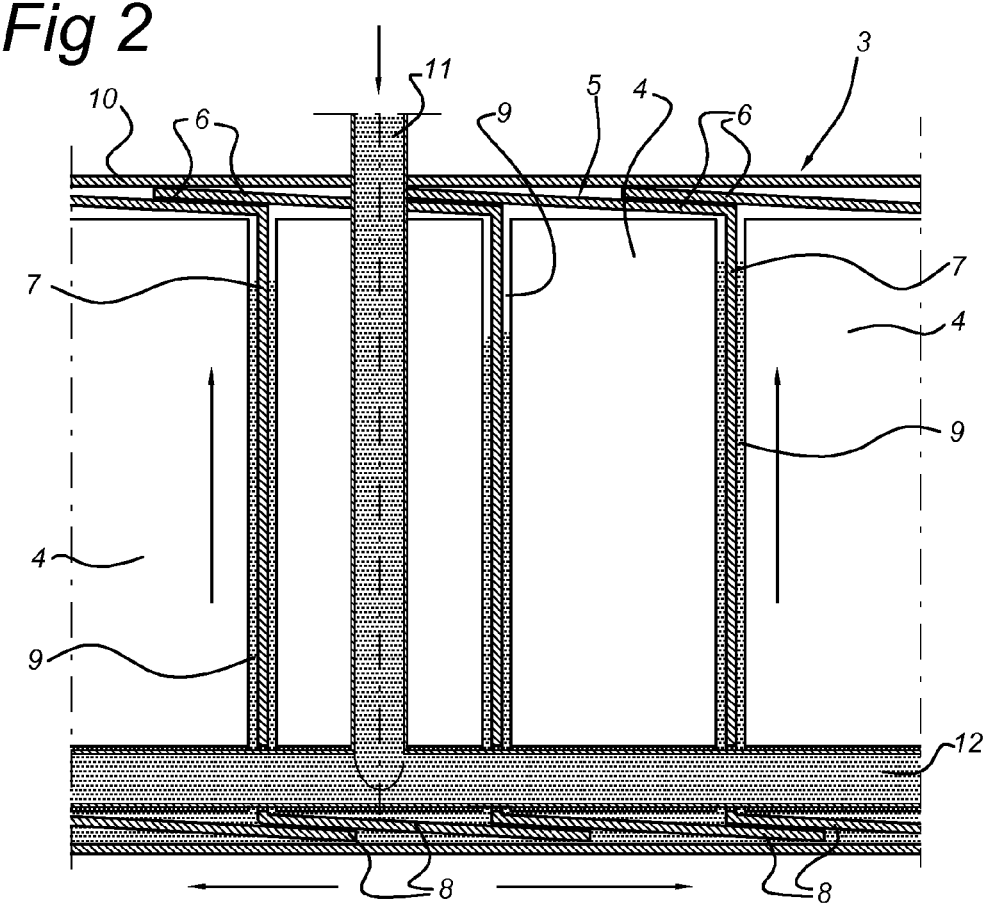
FIG. 2 shows the cross section along II-II from FIG. 1.

The inlet hoses 11 extend through in each case one or more of the core elements 4. To this end, a space may be left between two core elements 4, as is shown in FIG. 2, but it is also possible to interrupt one of the core elements 4 in order to make space for the inlet hoses 11. Each inlet hose 11 is connected to a transverse line 12 in such a manner that, as is illustrated in FIG. 2, injection material can spread transversely below the assembly. The transverse lines 12 are porous, in such a manner that the injection material can gradually flow out of them. The view from FIGS. 3 and 4 shows that the transverse lines 12 are situated in corresponding transverse recesses 13 of core elements 4 which adjoin one another in the length direction.

Figure 5:
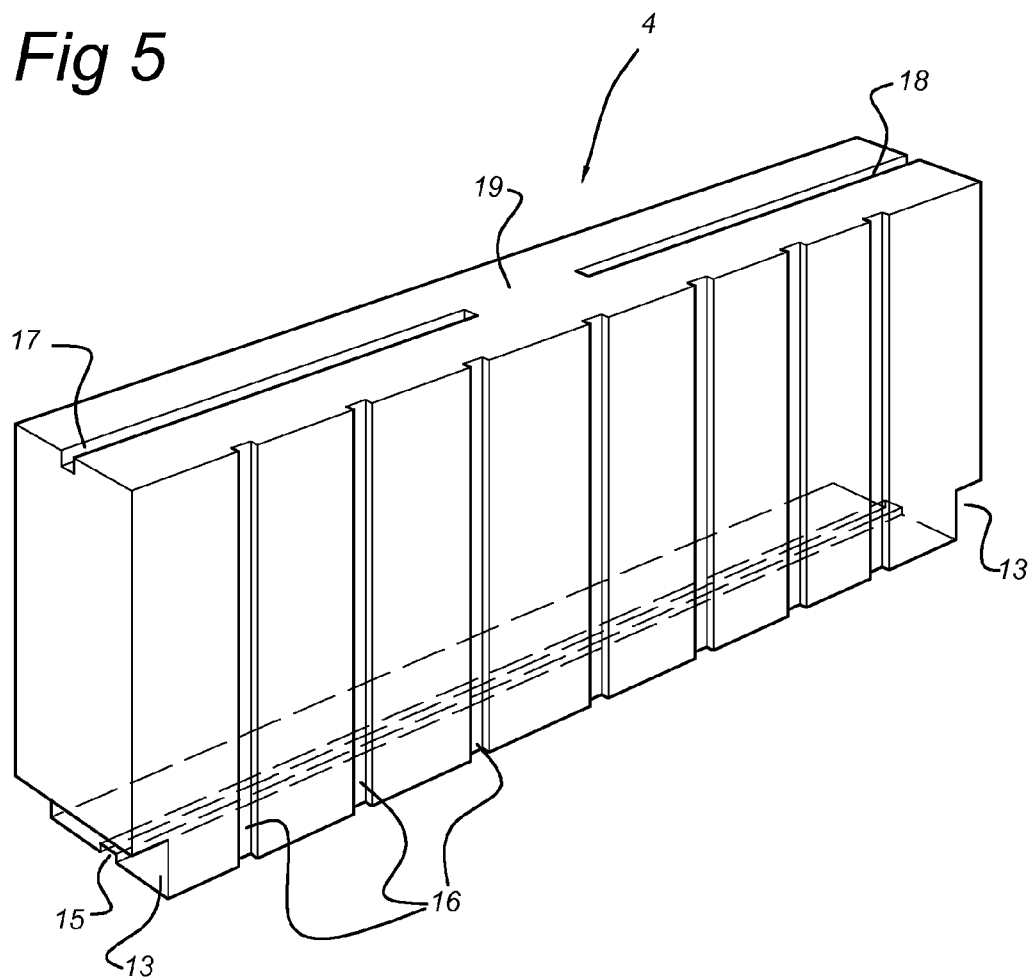
FIG. 5 shows a perspective view of a core element.

To each transverse recess 13, a longitudinal recess 15 which is provided centrally in the bottom surface of each core element 14 is connected, as is also illustrated in FIG. 5. Via this longitudinal recess 1, the injection material initially flows over the mould 1 and the material web parts 8 situated thereon. As is illustrated in FIG. 5, said longitudinal recess 15 extends between both opposite transverse recesses 13 of each core element 4. However, if the longitudinal recess is completely filled with injection material, the latter is forced to flow out of this longitudinal recess 15 in the transverse direction. The injection material is then pressed through the various layers composed of material web parts 8, resulting in a throttling effect which ensures an even distribution of the injection material across the longitudinal dimension of the core element 4. The injection material then flows upwards in the paths 9 formed between adjacent core elements 4 via the material web parts 8 and the adjoining vertical material web parts 7. The vertically extending side faces of the core elements have vertical ducts 16, 4 which force the injection material to flow upwards, each path 9 gradually being completely filled with injection material in the process. As soon as the injection material arrives at the upper surface of each core element 4, it is forced to flow through the horizontal material web parts 6 there. In this case as well, a throttling effect occurs, resulting in a regular distribution of the upflowing injection material across this upper surface of each core element 4. This upper surface has two duct parts 17, 18 extending in the length direction and separated by a wall 19. The injection material flowing across the upper surface passes into said duct parts 17, 18 and flows to the bridge 19.

Figure 3:
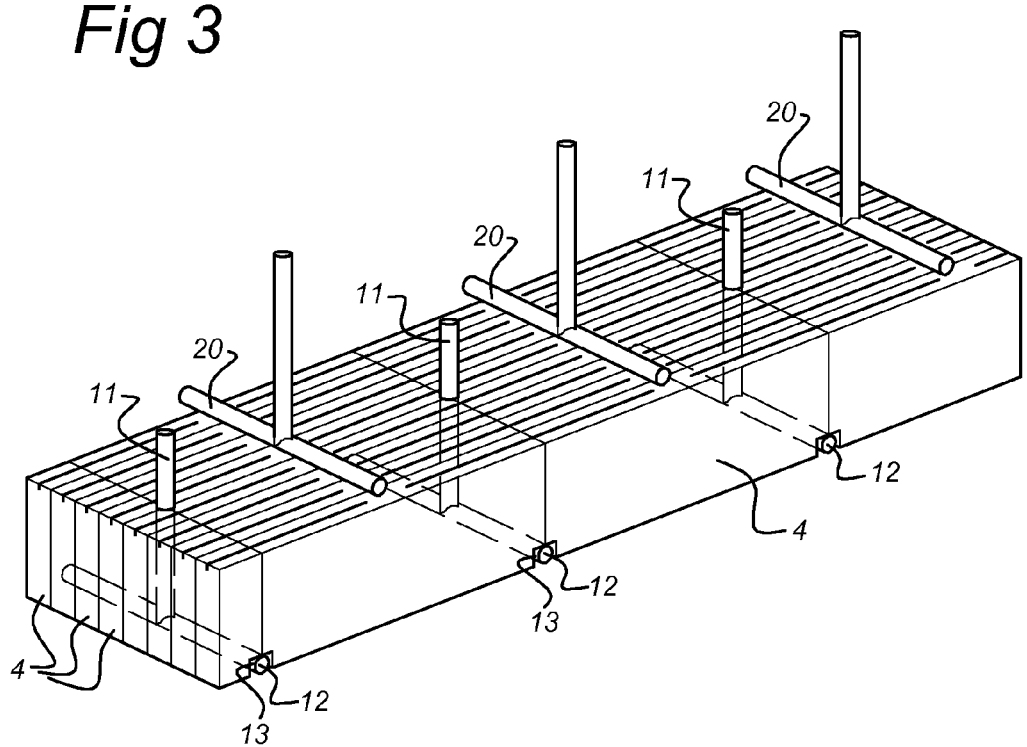
FIG. 3 shows a perspective view of a portion of the core with lines.
Figure 4:
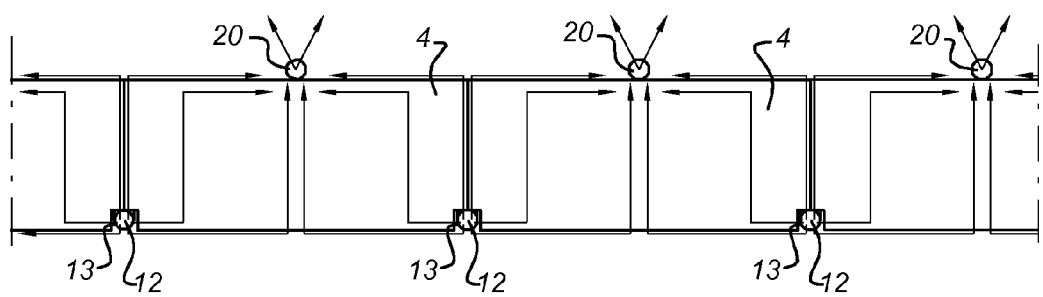
FIG. 4 shows a portion of a side view of the core with lines.

As is illustrated in FIGS. 3 and 4, a discharge line 20 extends at the location of the bridge 19 of the adjacent core elements 4 which are next to one another. Via this extraction line, gases and/or air are extracted. The position of these discharge lines is chosen such that their path and length which the injection material has to travel from the transverse line 12 to the discharge line 20 is of equal length in all parts of the core. This assists in filling the core completely and without inclusions of air.

Reference is made to FIGS. 6 and 7 with regard to the fitting of the transverse line 12. This inlet line 12 is composed of inlet pieces 21, the length of which is equal to the thickness of a core element 4. As soon as a core element 4 with a material web 5 thereon has been placed, an opening 22 is made in the vertical part 7 of the material web 5, so that an inlet line piece 21 can be inserted into said opening 22 and can be attached to a preceding inlet piece 21. Thus, by placing the core elements 4 and the material webs 5, the transverse line 12 is gradually constructed.

Figure 8:
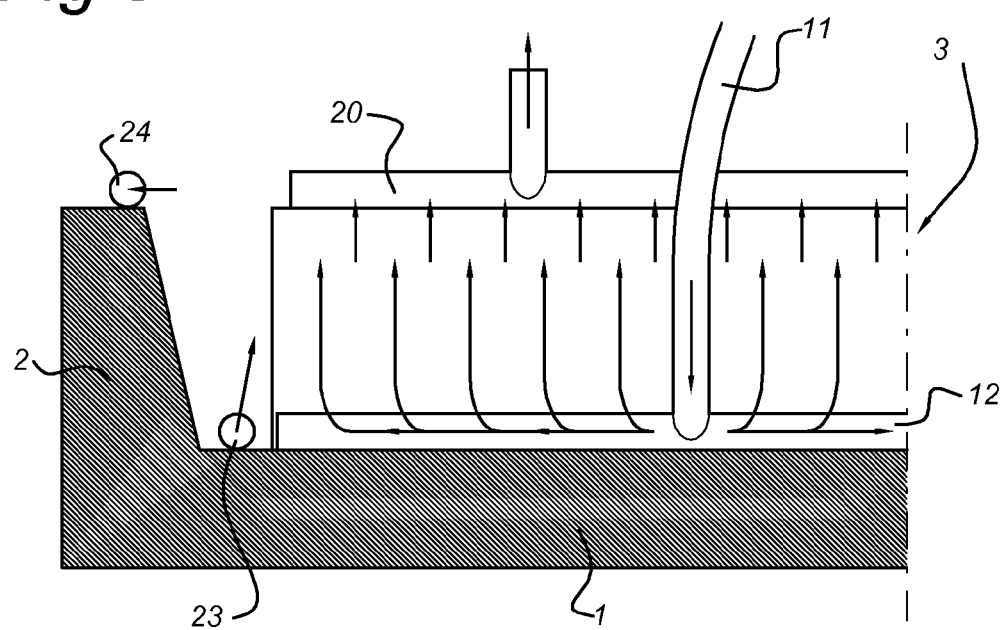
FIG. 8 shows a variant of the mould with the assembly according to the invention.

The variant from FIG. 8 shows that in addition to the inlet line 11 and transverse line 12, an additional inlet line 23 and discharge line 24 may be provided in the edge region of the assembly. Thus, it is ensured that the material webs can also be readily impregnated in those edge regions.

Although an embodiment is described above in which the liquid is supplied from below, it is also conceivable to use the reverse embodiment in which the liquid is supplied from above.

LIST OF REFERENCE NUMERALS

1. Mould
2. Mould portion
3. Assembly
4. Core element
5. Web material
6. Horizontal web portion
7. Vertical web portion
8. Horizontal web portion
9. Path
10. Cover layer
11. Inlet line
12. Transverse line
13. Transverse recesses
15. Longitudinal groove in the underside of the core element
16. Vertical side wall groove in the side wall of the core element
17. Groove portion in the upper side of the core element
18. Groove portion in the upper side of the core element
19. Wall between groove portions
20. Discharge line
21. Inlet line piece
22. Opening in vertical web portion
23. Auxiliary inlet line
24. Auxiliary discharge line

The invention claimed is:

1. A method of producing a panel, the method comprising:
   placing an assembly on a mold, the assembly comprising
      core elements, the core elements each having
         a first groove extending transversely to an injection line extending across the mold, the first groove extending in a first surface of the core element, and
         side wall grooves provided in side walls that extend in a direction parallel to the first groove,
         the first groove and the side wall grooves all being separated from one another, and impregnatable material webs extending along and between the core elements, the assembly including a first side and a second side situated opposite the first side;

enclosing the assembly under a cover layer by sealing, the assembly being enclosed under the cover layer in relation to the position of the mold;

introducing at least one inlet for injection material, the inlet ending at the first side of the assembly;

connecting the space, enclosed by the cover layer and the mold, to a discharge;

injecting the injection material via the inlet on the first side of the assembly and causing the injection material to move along via paths formed by the material webs between the core elements;

causing the injection material to flow laterally from the first groove situated in the first surface via the material of the material webs as far as into the side wall grooves; and discharging air and/or gas from the enclosed space via the discharge by underpressure at a position which is at a different level in relation to the position at which the inlet ends.

2. The method according to claim 1, further comprising:

forming a series of the core elements, the series of core elements being prismastic, block-like core elements;

causing each of the material webs to extend across an upper side of the series, between each of two adjacent core elements and across an underside of the series.

3. The method according to claim 2, further comprising:

arranging a series of the prismatic core elements parallel to one another; and providing the injection lines which extend across the mold, on a first side of the series, and which are oriented transversely to the core elements, the injection lines being connected to an inlet.

4. The method according to claim 3, further comprising:

providing a passage in each of the material web parts that extend between adjacent core elements; and providing each injection line through a series of the passages, that are aligned, in each of the material web parts.

5. The method according to claim 4, further comprising:

providing injection line pieces having a length dimension which is equal to the thickness dimension of a core element; and inserting one of the injection line pieces into one the passages in said material web after a core element has been placed and an associated material web has been arranged over said core element, and attaching said injection line piece to a previously-placed injection line piece or to an inlet piece.

6. The method according to claim 5, further comprising:

placing each of a plurality of discharge lines transversely across a second side of the series of core elements and across the material web parts which extend across the series; and offsetting the discharge lines in the center in between two of the injection lines.

7. The method according to claim 1, further comprising:

providing the core elements, each of which has groove parts in a second surface thereof, the groove parts being separated from one another and ending at opposite transverse sides of the core elements, the groove parts being parallel to the side walls in which the side wall grooves are situated;

causing the injection material to flow from the side wall grooves as far as into the groove parts via the material of the material webs; and positioning a discharge line between the ends of the groove parts facing one another in a second surface of each of the core elements.

8. The method according to claim 6, further comprising:

placing at least one auxiliary injection line at at least one of a plurality of edges of the assembly;

in a first phase, injecting the injection material only through the injection lines which extend transversely; and in a second phase, additionally injecting the injection material through the auxiliary injection line.

9. The method according to claim 8, further comprising:

placing an annular auxiliary injection line around the assembly;

providing a discharge which is situated in the center with respect to the annular auxiliary injection line;

supplying the injection material to the auxiliary injection line on one side of the assembly;

extracting only a portion of the injection material from the auxiliary injection line at a location thereof situated opposite the side where the inlet is situated; and discharging gases and/or air via the central discharge.

10. The method according to claim 1, further comprising:

arranging a series of the core elements parallel to one another, the core elements being prismatic core elements;

providing a plurality of injection lines which extend across the mold, on a first side of the series, and which are oriented transversely to the core elements, the injection lines being connected to an inlet providing the core elements, each of the core elements having groove parts which are in a second surface thereof, are separated from one another, and end at opposite transverse sides of the core elements, the groove parts being parallel to the side walls in which the side wall grooves are situated, causing the injection material to flow from the side wall grooves as far as into the groove parts via the material of the material webs; and positioning a discharge line between the ends of the groove parts facing one another in the second surface of the each of the core elements.

* * * * *